US008132985B2

(12) United States Patent
Melby et al.

(10) Patent No.: US 8,132,985 B2
(45) Date of Patent: Mar. 13, 2012

(54) ARMOR UNIT (75) Inventors: Jeffrey A. Melby, Vicksburg, MS (US); Stephen R. Collinsworth, Fairhope, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 371 days.

(21) Appl. No.: 12/522,266

(22) PCT Filed: Jan. 28, 2008

(86) PCT No.: PCT/US2008/052146
§ 371 (c)(1),
(2), (4) Date: Jul. 7, 2009

(87) PCT Pub. No.: WO2008/115617
PCT Pub. Date: Sep. 25, 2008

(65) Prior Publication Data
US 2010/0104366 A1      Apr. 29, 2010

Related U.S. Application Data (60) Provisional application No. 60/898,412, filed on Jan. 31, 2007.

(51) Int. Cl.
*E02B 3/12* (2006.01)
(52) U.S. Cl. .............. 405/16; 405/15; 405/17; 405/29
(58) Field of Classification Search .............. 405/15–17, 405/21, 25, 29, 30, 31, 33, 35; 52/604, 608, 52/609, 591.1, 591.2; 249/117
See application file for complete search history.

(56) References Cited

U.S. PATENT DOCUMENTS

| 2,909,037 | A |   | 10/1959 | Palmer |
|---|---|---|---|---|
| 3,176,468 | A |   | 4/1965 | Nagai |
| 3,456,446 | A |   | 7/1969 | Kusatake |
| 3,614,866 | A |   | 10/1971 | Kaneko et al. |
| 3,759,043 | A |   | 9/1973 | Tokunaga |
| 4,067,196 | A | * | 1/1978 | Schraudenbach ............... 405/16 |
| 4,347,017 | A |   | 8/1982 | Chevallier |
| D277,609 | S |   | 2/1985 | Deimen |

(Continued)

FOREIGN PATENT DOCUMENTS
JP          357130613        *  8/1982

*Primary Examiner* — John Kreck
*Assistant Examiner* — Sean Andrish
(74) *Attorney, Agent, or Firm* — Earl H. Baugher, Jr (57) ABSTRACT

Armor units for rubble mound structures including breakwaters, revetments, groins, jetties, and the like. Embodiments are appropriate for ocean, river, lake and reservoir structure armoring, to prevent erosion from damaging hydrodynamic forces resulting from waves and water currents, and the like. An embodiment includes a central rectangular section, three "half H-shaped" appendages, two identical frusta (end members), and a flat bottom with two extrusions, nominally smaller than other appendages and frusta. An embodiment is symmetric about two perpendicularly intersecting vertical planes extending through the centroid of the unit. The three half H-shaped members are connected to outer parts of a side defined as the top and the two longitudinal sides of the central section. The three half H-shaped members and the two end members comprise four-sided frusta that taper from a base at the central rectangular section to four-sided distal ends. For select embodiments, the frusta are generally symmetric.

18 Claims, 10 Drawing Sheets

U.S. PATENT DOCUMENTS

| | | | |
|---|---|---|---|
| 4,594,023 A | 6/1986 | O'Neill | |
| 4,594,206 A | 6/1986 | Grafton | |
| 4,633,639 A | 1/1987 | Deimen | |
| D300,863 S | 4/1989 | McNeely | |
| 4,856,935 A * | 8/1989 | Haras | 405/35 |
| 5,122,015 A | 6/1992 | Shen | |
| 5,190,403 A | 3/1993 | Atkinson | |
| 5,441,362 A | 8/1995 | Melby et al. | |
| 5,501,546 A * | 3/1996 | Dorrell | 405/25 |
| 5,556,230 A | 9/1996 | Turk et al. | |
| 5,620,280 A | 4/1997 | Melby et al. | |
| 6,666,620 B2 | 12/2003 | Yang | |
| 7,144,196 B1 | 12/2006 | Campbell et al. | |
| 2002/0031401 A1 | 3/2002 | Yang | |
| 2002/0114669 A1 | 8/2002 | Yang | |
| 2008/0292403 A1 | 11/2008 | Kim | |
| 2008/0298894 A1 | 12/2008 | van den Berge et al. | |
| 2008/0310919 A1 | 12/2008 | Kyung | |
| 2009/0035066 A1 | 2/2009 | Rubin | |

* cited by examiner

ARMOR UNIT

RELATED APPLICATIONS

This application is a national phase application, filed as a national stage under U.S.C. §371, of International Application No. PCT/US08/52146, filed Jan. 28, 2008, which claims the benefit Under 35 U.S.C. §119(e)(1) of prior U.S. Provisional Patent Application Ser. No. 60/898,412, Concrete Armor Unit, by Melby et al., filed Jan. 31, 2007, both incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States.

This and related patents are available for licensing to qualified licensees. Please contact Phillip Stewart at 601 634-4113.

BACKGROUND

Breakwaters are generally shore-parallel structures that reduce the amount of wave energy reaching the protected area. They are similar to natural bars, reefs or near shore islands and are designed to dissipate wave energy. For breakwaters protecting harbors, the breakwater acts as a barrier to wave energy and often to direct alongshore sediment transport away from the harbor. For shore protection, offshore breakwaters provide a reduction in wave energy in the lee of the structure slowing the littoral drift, producing sediment deposition and a shoreline bulge or "salient" feature in the sheltered area behind the breakwater. Some alongshore sediment transport may continue along the coast behind a near shore breakwater.

There are various types of breakwaters. These include:

Headland breakwaters, a series of breakwaters constructed in an "attached" fashion to the shoreline and angled in the direction of predominant wave approach such that the shoreline behind the features evolves into a natural "crenulate" or log spiral embayment.

Detached breakwaters that are constructed away from the shoreline, usually a slight distance offshore. They are detached from the shoreline, and are designed to promote beach deposition on their leeside.

Single breakwaters that may be attached or detached depending on what they are being designed to protect. A single detached breakwater may protect a small section of shoreline. A single attached breakwater, may be a long structure designed to shelter marinas or harbors from wave action.

System breakwaters refer to two or more detached, offshore breakwaters constructed along an extensive length of shoreline.

Rubble mound jetties are often referred to as breakwaters. They are oriented shore-perpendicular and usually built as a pair at a natural inlet, to provide extension of a navigation channel some distance from the natural shoreline. These structures redirect the sediment transport away from the navigation channel and constrain the tidal flow in the channel in order to make an efficient channel that requires little maintenance for navigation compared to a natural inlet.

Breakwaters are typically constructed in high wave energy environments using large armor stone, or pre-cast concrete units or blocks. In lower wave-energy environments, grout-filled fabric bags, gabions and other proprietary units have been utilized. Typical breakwater design is similar to that of a revetment, with a core or filter layer of smaller stone, overlain by the armoring layer of armor stone or pre-cast concrete units.

Armor units conventionally constructed of concrete are typically used to protect rubble mound structures in relatively high wave environments or where stone armor is not readily available. Rubble mound structures include breakwaters, revetments, jetties, caissons, groins and the like. Coastal rubble mounds are gravity structures. Conventional armor units are heavy in order to prevent displacement or rocking from waves and currents.

Armor units are typically displaced by one or both of two dominant modes of structure failure. The first is displacement of the armor which leads to exposure and erosion of filter layers and subsequently the core. The second is armor breakage. The breakwater or revetment capacity will be significantly reduced if either of these two failure modes occurs and progressive failure of the structure made much more likely. The under layer (filter layer) is sized so as to not move under undamaged armor and to prevent interior stone (e.g., small quarry-run stone) from escaping.

A wave is described by its height, length, and the nature of breaking. The wave height is the dominant forcing parameter considered in designing armor units. Other parameters include wave length, water depth, structure shape and height, armor layer porosity, degree of armor interlocking, inter-unit friction, and armor density relative to the water.

It is known that waves exert forces on armor units in all directions. Slender armor units usually require steel reinforcement while more stout armor shapes do not. Adequate steel (rebar) reinforcement increases material costs by roughly 100% over un-reinforced concrete. Both steel and polypropylene fiber reinforcement have been used to provide about 10-20% increase in flexural tensile strengths for large armor. units. The cost increase for the fiber-reinforced concrete equates to an equivalent percent increase in strength.

Existing concrete armor units are described in the U.S. Army Corps of Engineers design manuals Coastal Engineering Manual and the Shore Protection Manual. See, e.g., http://chl.erdc.usace.army.mil/chi.aspx?p=s&a=ARTICLES;104). Popular armor units include dolos, tribar, CORE-LOC®, ACCROPODE®, tetrapod, SAMOA STONE™, Antifer cube, concrete cube, shed and cob. The CORE-LOC® armor unit is protected by U.S. Pat. Nos. 5,441,362 and 5,620,280, each to Melby et al., and each incorporated herein by reference.

Commonly used concrete armor units have features that are advantageous for certain applications but are not suitable for other applications. Advantages include:

Highly porous so good wave dissipation (CORE-LOC®, ACCROPODE®, tetrapod, dolos, random cube, shed, cob, tribar)

Good interlocking in all directions (dolos, CORE-LOC®, tetrapod, Samoa Stone™)

Good structural capacity (small to medium sized CORE-LOC® and ACCROPODE®, tetrapod, cube, Samoa Stone™)

Armor layer can deform without catastrophic failure (random cube)

Simple mould construction (cube)

Simple armor unit to cast (cube, Samoa Stone™)

Simple armor unit to place (cube, Samoa Stone™)

Disadvantages include:

Poor interlocking (cube, tetrapod, other armor if not correctly placed)

Marginal structural capacity (very large CORE-LOC® and ACCROPODE®, large tribar, dolos, shed, cob)

Structure is brittle and fails abruptly (most concrete armor layers)

Relatively complex mould construction (CORE-LOC®, tribar, dolos, shed, cob, ACCROPODE®)

Relatively difficult armor unit to cast (CORE-LOC®, tribar, dolos, shed, cob, ACCROPODE®)

Difficult armor unit to place in low visibility or moderate background waves (CORE-LOC®, tribar, dolos, shed, cob, ACCROPODE®)

Relatively large under layer required because pore spaces are large (CORE-LOC®, tribar, dolos, ACCROPODE®)

For most armor units, it is difficult to achieve adequate interlocking when placing underwater. This is particularly true when the visibility is low and there are background waves during construction. For pattern-placed armor, it is virtually impossible to place them correctly with no visibility or when background waves are present. This condition is quite common. Many armor units require a relatively smooth under layer (CORE-LOC®, ACCROPODE®, tribar, shed, cob, cubes if pattern-placed). Achieving interlocking and a smooth under layer when there is low visibility and background waves is extremely difficult and the uncertainty has led to cost overruns and even breakwater failures.

Relatively slender armor units, such as dolos, CORE-LOC®, ACCROPODE®, tribar, and hollow blocks like the shed and cob, require high-cost moulds and are challenging to cast. Metal mould cost depends on the number of plates and complexity of the bends. Some armor unit moulds require 75-100 plates. Cubes require the fewest plates but have all the concrete concentrated in one mass. This produces high heat of hydration and potential thermal cracking. Tall moulds used for large dolos, CORE-LOC®, ACCROPODE®, and hollow blocks also have potential for significant strength variations throughout the armor unit because the aggregate settles, compaction is greater at the bottom of the mould, and water rises when the concrete is vibrated during casting. High water-to-cement ratios and over-vibration, which can occur in poorly supervised construction, results in degraded armor units. For example, aggregate can concentrate in the lower portion of the unit while the upper portion has an abnormally high water-to-cement ratio yielding weaker concrete. In addition, complex shapes have horizontal or shallow sloping surfaces where water can pool in the mould, further reducing strength. The result is that tall complex shapes depend greatly on the quality of construction processes and can yield less than optimum strength.

The application dictates the appropriate armor unit. For shallow, clear water with insignificant background wave conditions, and waves under eight meters in height, most of the previously discussed armor units can be constructed and placed without difficulty. In these cases, an engineer chooses the least expensive unit that provides the prescribed reliability. However, for low visibility, high background wave conditions, or waves of eight meters or greater, the disadvantages of inexpensive existing armor units mean that construction of a quality structure is going to be difficult and expensive and may even be filled with uncertainty. Further, long slopes in armored configurations provide more opportunity for down-slope settlement and potential armor breakage or displacement as the interlocking is lost. Although cube armor units are relatively easy to construct, they do not interlock so maintenance costs are much higher than other designs and cube armor requires far more concrete than many other designs.

Interlocking concrete armor units or erosion prevention modules are well-known in the patented prior art as evidenced by the Kaneko et al., U.S. Pat. No. 3,614,866 and Chevallier, U.S. Pat. No. 4,347,017.

The Kaneko et al. patent discloses a polypod block comprised of at least three integral pillar-shaped parts joined in an alternately crossed relationship. Hence, the block has at least six appendages which interlock with other blocks so that a large number of blocks can be arranged to form tightly assembled combinations. The pillar-shaped members are joined together with a minimum amount of shared surface area yielding significant stress-concentrations at joints. Because of this, the configuration has a high probability of breaking individual units, potentially leading to massive failure of the configuration. Further, the appendages do not stay connected because the pillar-shaped members have a square cross-section that provides a limited area of frictional engagement with neighboring blocks. Because of the regular arrangement of the individual units, catastrophic failure of the installed configuration can result from the failure of a relatively few armor units. Finally, regularly placed units of the configuration produce an armor layer with very low porosity, providing little wave energy dissipation and therefore little contribution to reduction in wave energy for the protected area in the lee of the configuration.

The Chevallier patent discloses an armor unit, commonly known as the ACCROPODE®, for protecting riverside structures and shorelines. The unit comprises a cubic central core having top and bottom surfaces provided with anvil-shaped legs and opposed front and rear legs in the form of four-sided truncated pyramids. Hydraulic stability characteristics of the Chevallier unit are good if the units are well interlocked but marginal if not because of the anvil-shaped legs that provide minimal unit-to-unit wedging. The units rely primarily on gravity forces from overlying units to enhance individual unit stability. Therefore these units must be placed on steep slopes to assure stability. However, steep-sloped structures have a tendency to fail catastrophically and have proven to have a high probability of failure and risk when used in low-visibility waters, in deep water, or when construction is done in relatively high wave environments. Placed on slope, a Chevallier unit exhibits characteristics of a low-porosity armor layer due to the fact that it is placed in a single layer. This provides less reduction in wave energy than found in an armor layer composed of multiple layers of more slender armor units. Further, the Chevallier blocks require fairly severe constraints and specifications for placement on the breakwater in order to develop enhanced hydraulic stability.

Practical difficulties result in the manufacture, storage and transport of armor units. For example, some armor units have shapes which are not easily cast or formed. For example, the units of Yang, U.S. Pat. No. 6,666,620 B2 contain complex leg formations ("a cylindrical body, tapered lump legs projecting from the cylindrical body and branch legs cylindrically projected through a circular base disposed on the cylindrical body"). Some armor units, such as the Yang units, do not allow for nested placement in yard areas or in shipping barges, and consequently are difficult to store and ship efficiently. Also, some structures are not repairable by simple addition of replacement armor units, but must be partially disassembled. For example, the units of Detiveaux, U.S. Pat. No. 6,361,247 B1 require insertion of a long spike section into the earth and stabilization of the section with guide wires. The amount of wave dissipation is minimal provided through small windows in the top of the structure.

The designs of Melby et al. addressed many inherent weaknesses of the above designs but provided little improvement over existing shapes in fabrication, requiring skilled supervision in casting the final product, as well as for emplacement of individual units where poor visibility or moderate to severe wave action exists.

Concrete armor units are shaped to provide improved performance over stone as armor. The unit's shape may include appendages to promote interlocking between neighboring units. Hundreds of shapes have been developed, however, relatively few shapes are used as noted in the abbreviated list above. Many shapes are either too slender, thus prone to breaking, or provide resistance to wave forces in only a single plane, e.g., Detiveaux.

There is thus a need for a durable interlocking armor unit capable of random placement resulting in a stable configuration that has strong individual units while being relatively straightforward to fabricate. Each unit should have slender appendages to provide improved stability and wave energy dissipation yet be strong enough to prevent failure of any single unit. The unit should be suitable for repair of existing slopes. It should be relatively simple to fabricate and lend itself to ready stacking for storage and shipping, thus reducing overall cost, as well as to emplacement in conditions not conducive to emplacing existing units.

DETAILED DESCRIPTION

Figure 2A:
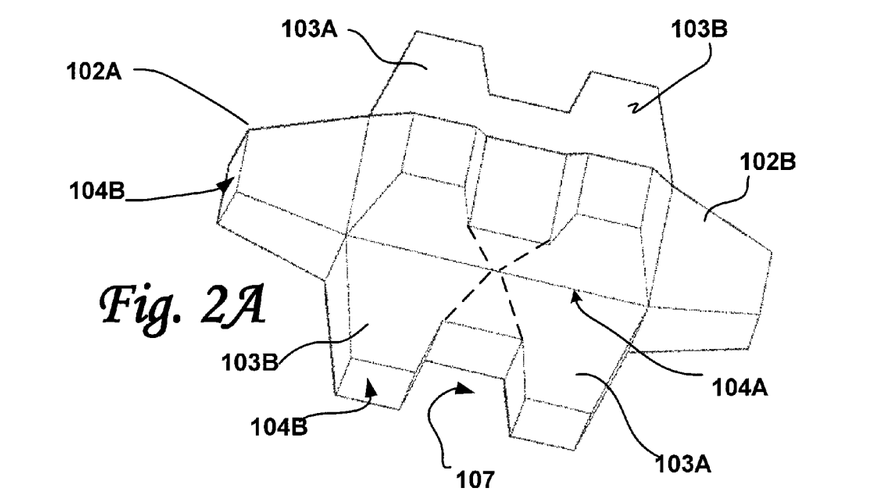
FIG. 2A is a perspective view from the top of a select embodiment of the present invention.

Select embodiments of the present invention envision a concrete armor unit 100 for armoring alongshore structures of rivers, lakes, and reservoir banks; coastal shorelines and coastal revetments; and rubble mound breakwaters, jetties, caissons and groins to prevent erosion from damaging hydrodynamic forces of waves and water currents. The armor unit 100 may also have application to dam spillway and riverine baffle systems required to slow hydraulic flow. Select embodiments of the present invention provide an armor unit (erosion prevention module) 100 that is uniquely configured to produce a high degree of interlocking while providing stability on steep as well as relatively shallow slopes on which it may be installed. Refer to FIG. 2A providing a perspective including a top surface 201 of the central core (rectangle) 101 of a select embodiment of the present invention and FIG. 2B providing a perspective including a bottom surface 202 of the central core 101 of a select embodiment of the present invention, the bottom surface 202 parallel to the top surface 201. The module 100 has two identical end formations (frusta) 102, each of which contribute to extending the central core 101 in the same plane as the central core 101 and along its longitudinal axis, three identical side formations (frusta) 103A, B each pair 103 A, B joined by a fillet 105 of depth, t, the side formations 103A, B extending the central core 101 along the two axes perpendicular to its longitudinal axis, two of the side formations 103A, B opposing each other in the same plane as the central core 101 and one of the side formations 103A, B positioned on the top surface 201 of the central core 101, and two identical symmetrically placed extrusions (frusta) 106 A, B that protrude from the bottom surface 202 of the central core 101, all formations 103A, B and extrusions 106A, B contributing to hydraulic stability and wave energy dissipation. Internal stress levels are minimized by adding the fillet 105 between each of the intersections of the two frusta 103A, B on each of the two long sides 2L and of the two frusta 103A, B on the top surface 201 of select embodiments of the present invention and by providing extrusions ("supports" that are frusta) 106A, B symmetrically placed along the longitudinal axis on the bottom surface 202.

Figure 1:
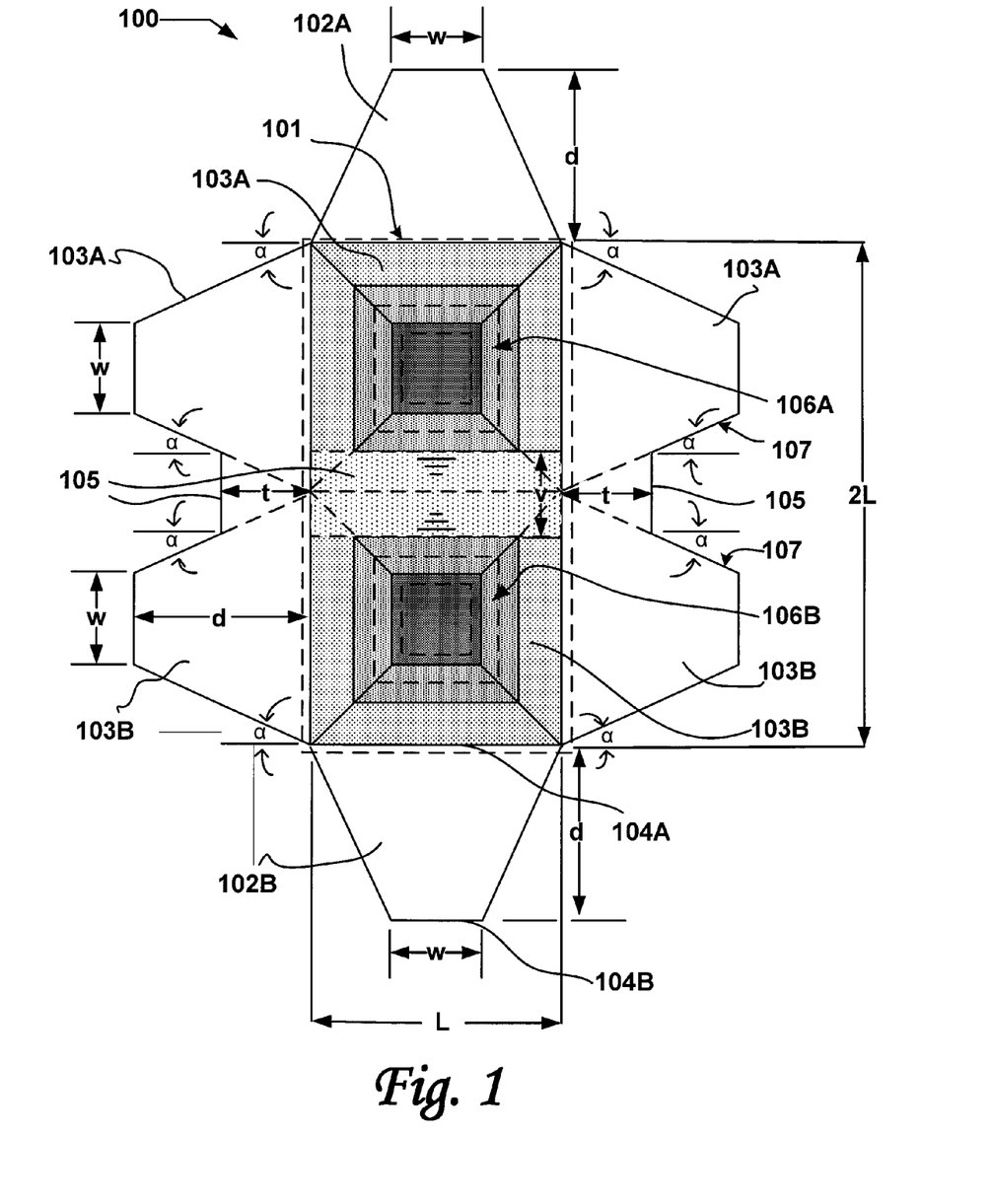
FIG. 1 is a top view of a select embodiment of the present invention.

Refer to FIG. 1. Select embodiments of the present invention may comprise: a central rectangular core 101A as represented by the dotted lines and of length, 2L, and width, L, with elongate axis centrally located as to all protrusions extending from the central core 101A, two identical end formations 102A, B, each of which contribute to extending the central core 101A longitudinally in the same plane as the central core 101A, each of the surfaces of the end formations 102A, B, except end surfaces parallel to the narrow ends of the central core established at an angle, α, measured from the sides of the central core 101A from which the formations 102A, B protrude, and along three of the four long sides of length, 2L, of the central core 101A, three identical side formations 103A, B each pair 103A, B joined by a fillet 105 of depth, t, the side formations 103A, B extending the central core 101A along the two axes perpendicular to its longitudinal axis, two of the side formations 103A, B opposing each other in the same plane as the central core 101 and one of the side formations positioned perpendicular to the top surface 201 (FIG. 2) of the central core 101, each of the surfaces of the side formations 103A, B, except end surfaces parallel to the long ends, 2L, of the central core 101A established at an angle, α, measured from the sides of the central core 101A from which the side formations 103A, B protrude, and two identical symmetrically placed extrusions 106A, B that protrude from the bottom surface 202 (FIG. 2) of the central core 101A, each of the surfaces of the extrusions 106A, B, except end surfaces parallel to the narrow ends, L, of the central core 101A established at an angle, α, measured from the bottom surface 202 of the central core 101A from which the extrusions 106A, B protrude, all formations 103A, B and extrusions 106A, B contributing to provide hydraulic stability and wave energy dissipation. Internal stress levels are minimized by adding the fillet 105 of depth, t, between each of the intersections of each of the two formations 103A, B on each of the two sides, 2L, and of the formations 103A, B on the top surface 201 of select embodiments of the present invention. Each side formation (frustum) 103A, B and extrusion (frustum) 106A, B has a rectangular cross-section at its proximal base 104A and a smaller rectangular cross-section at its distal end base 104B due to the tapering at angle, α, of the four sides of each of the frusta 103A, B, 106A, B away from its proximal base 104A. End frusta 102A, B are positioned on each of the narrow ends, L, of the central core 101A, with a longitudinal central axis coincident with the longitudinal central axis of the central core 101A. End frusta 102A, B may have a similar cross section to the side frusta 103A, B103 such that each end frustum 102A, B has a rectangular flat bottom surface coincident with the bottom surface 202 of the central core 101A. This geometry facilitates wedging between neighboring armor units 100, such that the armor unit 100 is symmetric about a vertical plane extending through the centroid parallel to the central elongate axis of the central core 101A and such that the armor unit 100 is symmetric about a vertical plane extending through the centroid and perpendicular to the central elongate axis. In select embodiments of the present invention the side and end formations 103A,B, 102A,B are equal in height, d (FIG. 1) and the extrusions 106A, B are <d.

Note that setting the thickness of the central core 101 equal to the width (thickness and width defining the dimensions of the ends of the central core 101) creates square bases for the end frusta 102A, B and if the length of the central core 101 is equal to twice its width, the frusta 102A, B, 103A, B may be of the same shape at the base. If the angle of slope, α (FIG. 1) is held constant for all four faces of each frusta 102A, B, 103A, B, the frusta 102A, B, 103A, B are the same shape overall. Finally, if the height, d, of each of the frusta 102A, B, 103A, B is also identical, all frusta 102A, B, 103A, B are identical having square bases and distal bases 104B that are square.

Figure 2B:
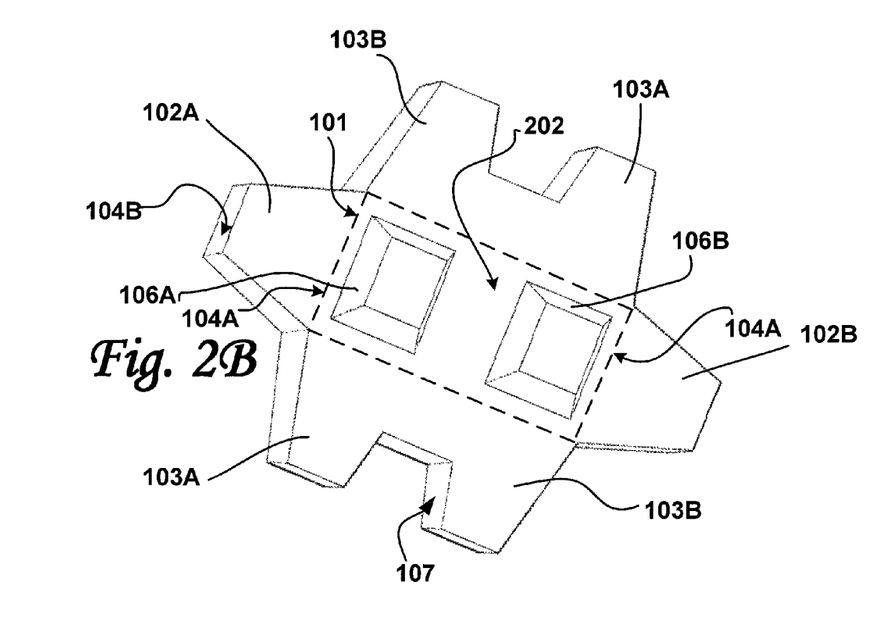
FIG. 2B is a perspective view from the bottom of a select embodiment of the present invention.
Figure 3:
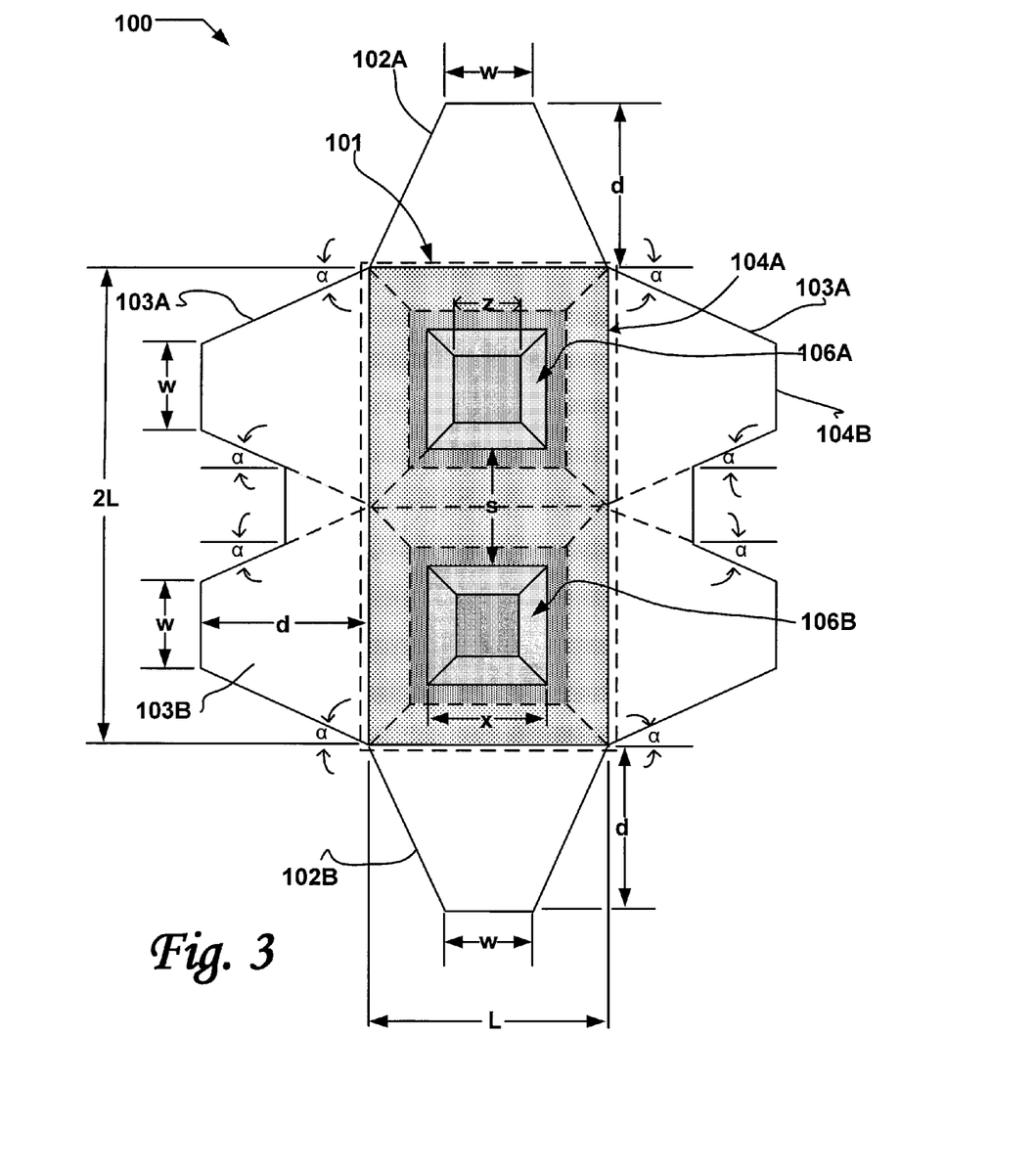
FIG. 3 is a view looking at the bottom of a select embodiment of the present invention.
Figure 4:
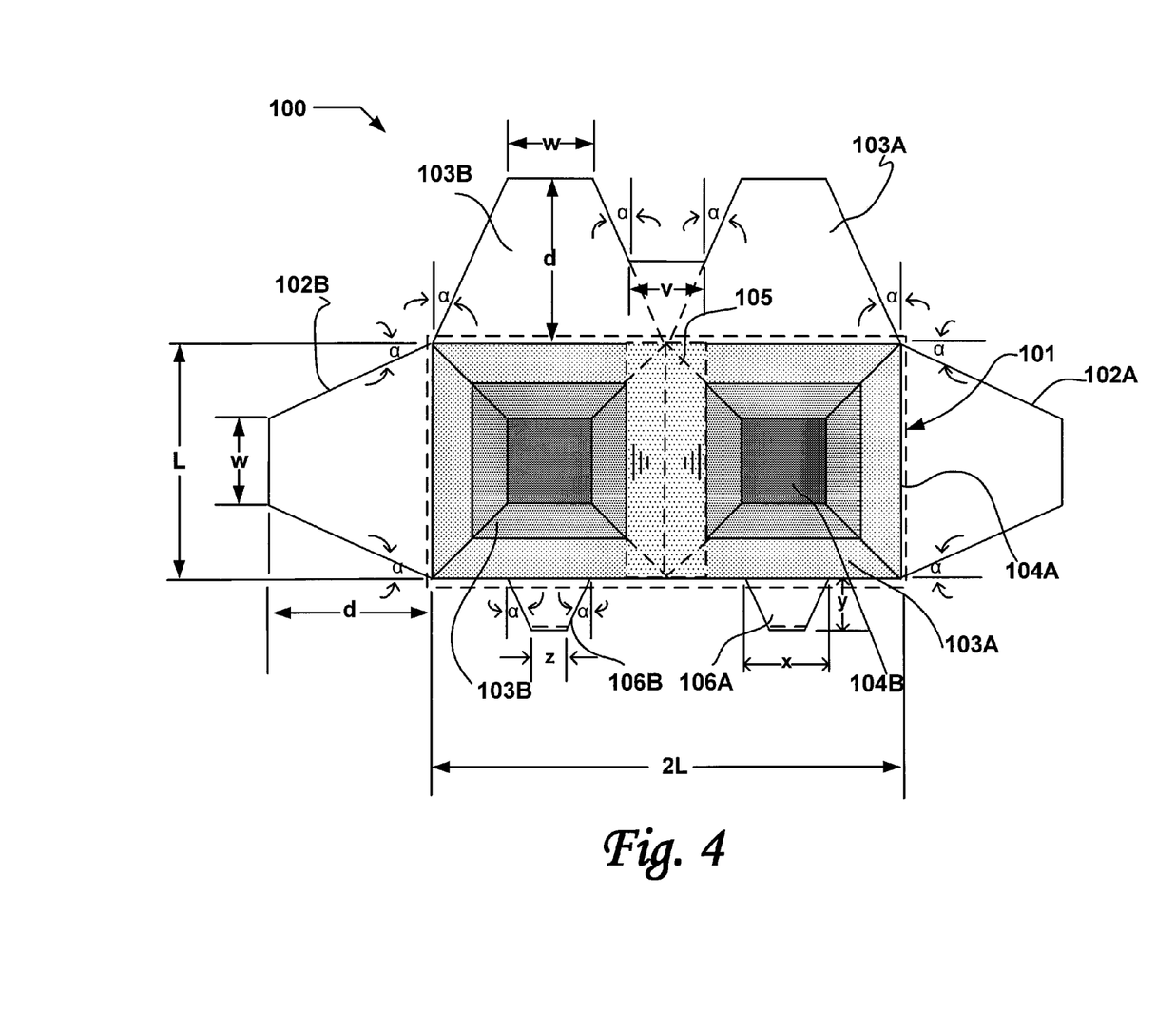
FIG. 4 is a view looking at the longest side of a select embodiment of the present invention.

Select embodiments of the present invention provide armor units 100 as the fundamental component for protecting ocean, coastal, river, lake and reservoir banks, and base structure layers from the damaging hydrodynamic forces of waves and water currents. Refer to FIG. 1. In select embodiments of the present invention, an armor unit includes a central core 101 having a length, 2L, longer than its width, L, and a depth equal to (see L at FIG. 4) or shorter than its width, L. Each of two of the long sides and the top 201 of the central core 101 include two outer members 103A, B that are frusta whose four-sided bases are each defined by one-half of the perimeter of the long side of the central core 101 and a line bisecting the longitudinal axis of the central core 101. In select embodiments of the present invention, a fillet 105 in the center of each of the two long sides and the top 201 effectively shortens the "internal" (facing) side 107 of each of the frusta 103A, B. On each of the two ends (short sides) of the central core 101 is a single frustum 102A, B whose four-sided base is defined by the width and depth of the central core section 101. Width, L, and depth, L, are shown as equal if FIGS. 3 and 4 are taken to be of the same armor unit 100, but need not be. The remaining long side (bottom) 202 in FIG. 2B has two frusta 106A, B incorporated as "supports" and thus this fourth long side defines the bottom surface 202 of the armor unit 100, established for ease of fabrication of the armor unit 100 as well as for the utility of it. These supports 106A, B may be frusta of the same general shape as that of frusta of the other three sides 103A, B, of the ends 102A, B, or both, and may be centered in the same location on the bottom 202 as those frusta 103A, B on the opposing (top) 201 side. In select embodiments of the present invention, the four-sided base of these two supports (frusta) 106A, B has a smaller perimeter and the height, d, of these two frusta 106A, B is shorter than those of the frusta 103A, B on the other two long sides. This design promotes a high degree of wedging while providing many paths for wave dissipation over the surfaces of the appendages 102A, B, 103A, B, 106A, B of the armor unit 100.

Select embodiments of the present invention may incorporate internal reinforcing bars or "rebar." A suitable reinforcement may be that described in U.S. patent application Ser. No. 11/234,184, to Day et al., incorporated herein by reference. Select embodiments of the present invention were developed to provide optimized armor units 100 for situations when conditions are not ideal for casting or placing concrete armor units 100, or both. Select embodiments of the present invention are designed to be stout, simple to cast, and easy to place in adverse conditions on a breakwater, revetment, or jetty. Refer to FIGS. 2A and 2B. For select embodiments of the present invention, the shape resembles a stout crocodile with short nose 102A and tail 102B, four short legs 103A, B on the sides, and two back ridges 103 A, B, hence the name C-ROC™. In select embodiments of the present invention, the bottom ("belly") 202 is flat except for two or more short extrusions 106A, B.

For select embodiments of the present invention, the molds are less expensive to fabricate than conventional armor units because the number of plates is less. For select embodiments of the present invention the mold has only 33 flat plates in its primary configuration. This is one of the lowest plate numbers of known complex-shaped interlocking armor units. Further, since all plates are flat the mold is relatively easy and inexpensive to construct.

For select embodiments of the present invention, casting is simple because the vertical height of formations 102A, B, 103A, B and extrusions 106A, B in any direction is shorter than conventional armor units. In select embodiments of the present invention the casting mold is open on the bottom allowing the armor unit 100 to be cast on a slab with holes (not shown separately) for belly extrusions 106A, B. Thus, select embodiments of the present invention have a low center of gravity (cg) during casting. This low cg limits water pooling and aggregate movement while needing only minimal vibration to insure the integrity of the casting. Further, with the broad center of the unit's mass directly supported by a casting slab, there are little, if any, tensile stresses developed during casting.

The shape of select embodiments of the present invention is not as slender in select dimensions as any of the dolos, CORE-LOC®, ACCROPODE®, or hollow blocks like the shed and cob. Typical embodiments of the present invention require 38% more material than an equivalent CORE-LOC® armor layer, 27% more material than an ACCROPODE® armor layer, and 20% less material than an armor layer made with dolos armor units.

Select embodiments of the present invention are constructed such that each armor unit is placed with its longitudinal axis roughly perpendicular to the slope of the breakwater or revetment, i.e., roughly horizontally on the slope. This results in spacing between select embodiments of the present invention being less than for most large conventional armor units. This configuration reduces or prevents movement of the under layer. In addition, placement on a breakwater or revetment is simple and can be done in low visibility conditions or with moderate background wave conditions. It is expected that divers with specialized skills would not be required since straightforward techniques are used for emplacement.

Hydraulic stability tests of select embodiments of the present invention demonstrate that these embodiments are very stable when placed on a typical breakwater cross section at a slope of 1V:2H. The Hudson stability equation is used to design armor units for a given incident wave height, a given stability coefficient and breakwater slope. The equation is given by $$W = \frac{\gamma_r H^3}{K_D (S_r - 1)^3 \cot\alpha} \quad (1)$$

where:
- W=mean weight of an armor unit,
- $\gamma_r$=unit weight density of material comprising armor unit,
- H=design incident wave height near the structure (breakwater or revetment),
- $K_D$=empirical stability coefficient describing the effect of parameters (e.g., breaking waves) that are not individually identified,
- $S_r$=specific gravity of armor unit material relative to water that the structure is in, and
- cot α=seaward structure slope.

$K_D$ describes, in part, the degree of interlocking of the unit. The higher the $K_D$, the higher the stability. For example, stone exposed to breaking waves has a $K_D$=2 give the condition of 5% eroded volume for the stone. Early tests of dolos, CORE-LOC® and ACCROPODE® indicated a $K_D$ greater than 50 with little or no measurable damage. The values recommended for design are $K_D$=8-16 for dolos, $K_D$=12-16 for CORE-LOC® and $K_D$=10-13 for ACCROPODE®.

The unit weight density, $\gamma_r$, of the material selected for the armor unit is an important factor in attaining both an optimum weight and toughness of the armor unit. One such material is an improved high strength concrete as described in U.S. Pat. No. 7,744,790 B2 to O'Neil et al., incorporated herein by reference.

The CORE-LOC® armor unit is regarded as the most stable of commonly used armor units. Tests of select embodiments of the present invention yielded a $K_D$ of 61 with no instability on the seaward slope, indicating these embodiments have stability characteristics comparable to the best shapes available. Because select embodiments of the present invention are not fragile as are more slender armor units, reliability of select embodiments of the present invention is greater.

In select embodiments of the present invention the armor unit 100 comprises in large part portland cement-based concrete.

For select embodiments of the present invention, the uniform tapering of the side frusta 103A, B at angle, α, facilitates wedging of adjacent armor units 100 when placed in a layer on a rubble mound. The uniform taper also aids in removal of the mold during fabrication. For select embodiments of the present invention the flat bottom surface 202 facilitates casting and the added extrusions 106A, B insure bottom surface roughness and interlocking when the armor unit 100 is installed.

EXAMPLE

Refer to FIG. 1 depicting a top view of a select embodiment of the present invention. This view also shows the position of two "extrusions" (supports) 106A, B (dotted lines) on the bottom of the armor unit 100 relative to the frusta 103A, B on the top surface 201 of the armor unit 100.

In this example, the length of the central core is 2L, the width is L, and the depth is L. Thus, each of the frusta 102A, B, 103A, B have square bases of the same dimension, lending to the overall symmetry of the armor unit 100. Note that each of the two frusta 103A, B 103 on each of two longitudinal sides and the top have a square base of L×L, just as the end frusta 102A, B do (see FIG. 4 for a side view confirming a thickness of L). If the fillet 105 were not employed, one could readily observe that two side frusta 103A, B touch at the center of each long side of the central core 101 with the top frusta 103A, B configured similarly. As to the fillet 105, the width, v, is defined by selecting the depth, t, of the fillet 105. Similarly, the dimension, w, of the square top surface of each frusta 102A, B, 103A, B is defined by selecting the height, d, with the taper having been previously specified by the angle, α.

In select embodiments of the present invention, to optimize symmetry of the armor unit 100, the angle of taper, α, is maintained the same for at least the frusta 103A, B of the two sides, the top and the frusta 102A, B at the two ends. This angle may even be maintained for the two or more extrusions 106A, B as shown in FIG. 4.

Refer to FIGS. 3 and 4, depicting a view of the bottom 202 and a side, respectively, of the armor unit 100 of FIG. 1. As can be seen in this embodiment, each extrusion 106A, B is "centered" on a vertical line through the armor unit 100 that passes through the middle of a corresponding frusta 103A, B on the top side 201. The slope of the short frusta comprising an extrusion 106A, B may be set equal to that of the other frusta 102A, B, 103A, B i.e., set at α. Given α and the dimension, x, of the side of the base of the extrusions 106A, B, the space, s, between the extrusions 106A, B is defined. Further, given the dimension, u, of the side of the top surface of the extrusions 106A, B (the surface on which the armor unit 100 would sit as shown in FIG. 4), the height, y, of the extrusions 106A, B is defined.

Figure 5:
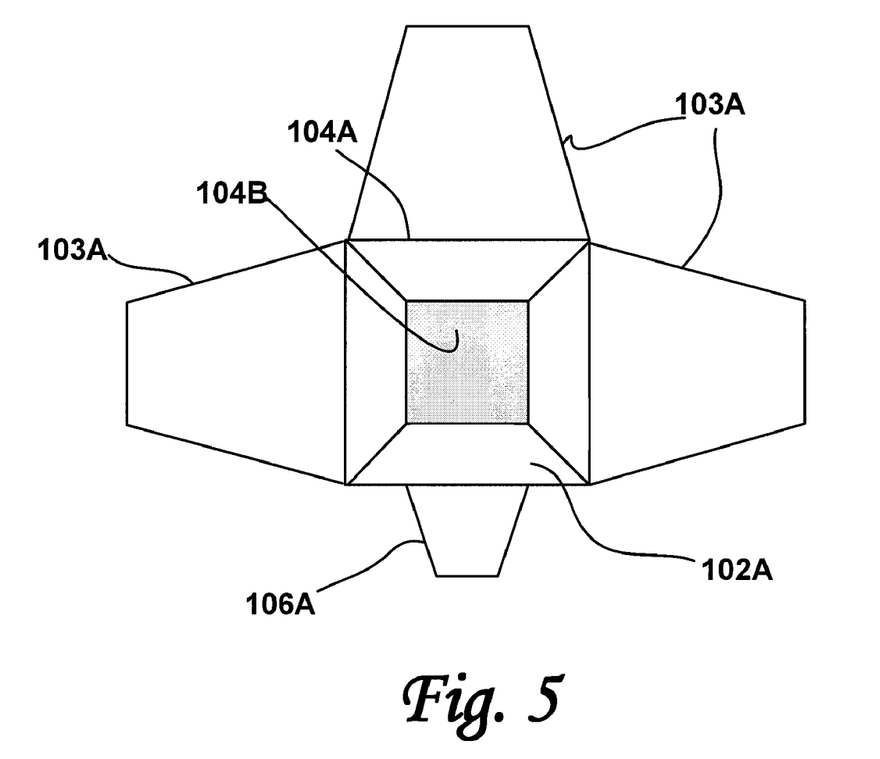
FIG. 5 is a head-on end view of a select embodiment of the present invention, looking down the longest axis.

Refer to FIG. 5, a "head-on" end view of the "A end" of the embodiment of FIG. 1. In this view, the symmetry is apparent when the thickness of the central core 101 is chosen to be equal to the width of the central core 101. Given the 2:1 relationship of length, 2L, to width, L, and selection of a common taper pre-specified as α as shown in FIG. 1, each of the two illustrated "side" frusta 103A and the top frusta 103A are identical in base area to the end frusta 102A. If the height, d, is common to both the end 102A, B and side 103A, B frusta, then the four side frusta 103A, B, the two top frusta 103A, B and two end frusta 102A, B extend equidistant from the central core 101 and provide the same cross section at their respective distal bases 104B.

Refer to FIGS. 2A and 2B. The thickness of the central core 101 need not be the same as the width. With a thickness less than the width, an embodiment would be as presented in FIGS. 2A and 2B, exhibiting a rectangular face at the distal base 104B of each of the frusta 102A, B, 103A, B (as contrasted with the example above yielding a square face), and possibly that of the extrusions 106A, B if symmetry with the top side frusta 103A, B is desired.

Figure 6:
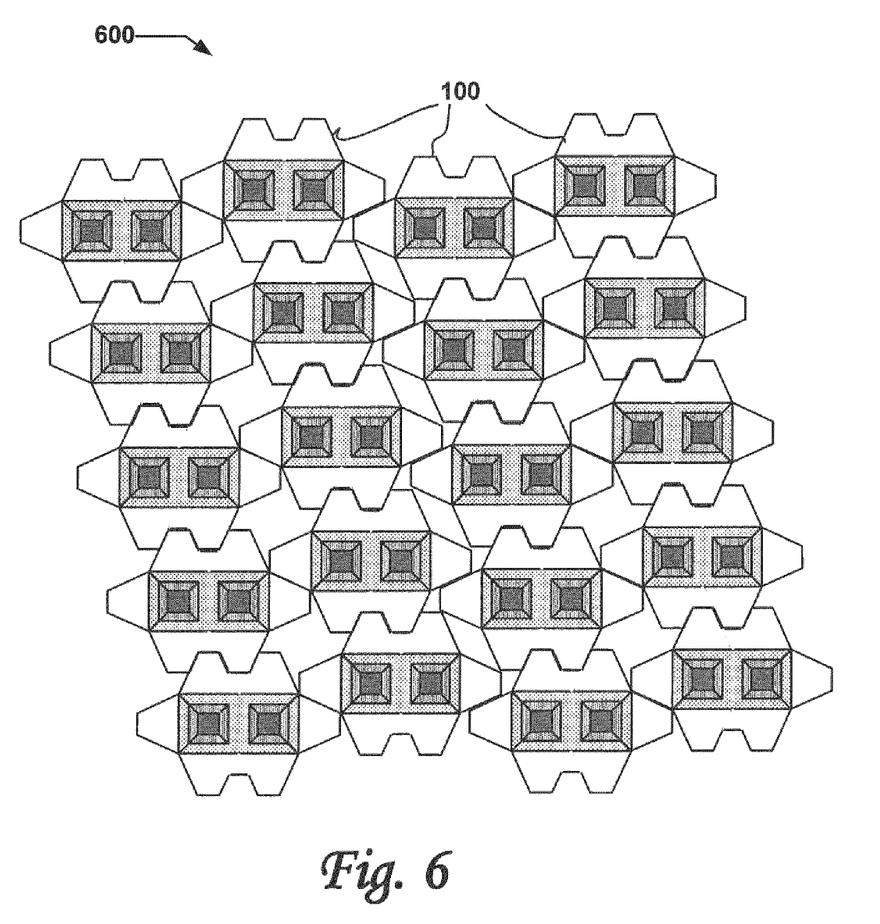
FIG. 6 is a top view of a single layer interlocking configuration of the embodiments of FIG. 1 as may be installed on a breakwater.

Refer to FIG. 6, an interlocking single layer configuration 600 of the individual armor units 100 as shown in FIG. 1. The individual armor units 100 are arranged with longitudinal axes horizontally along the slope of the breakwater. This provides a series of zigzag horizontal lines of armor units 100 each interlocked with an armor unit 100 in the lines above and below it and each having end frusta 102A, B abutting along their slope with end frusta 102A, B of adjacent armor units 100 in the horizontal line.

Figure 7:
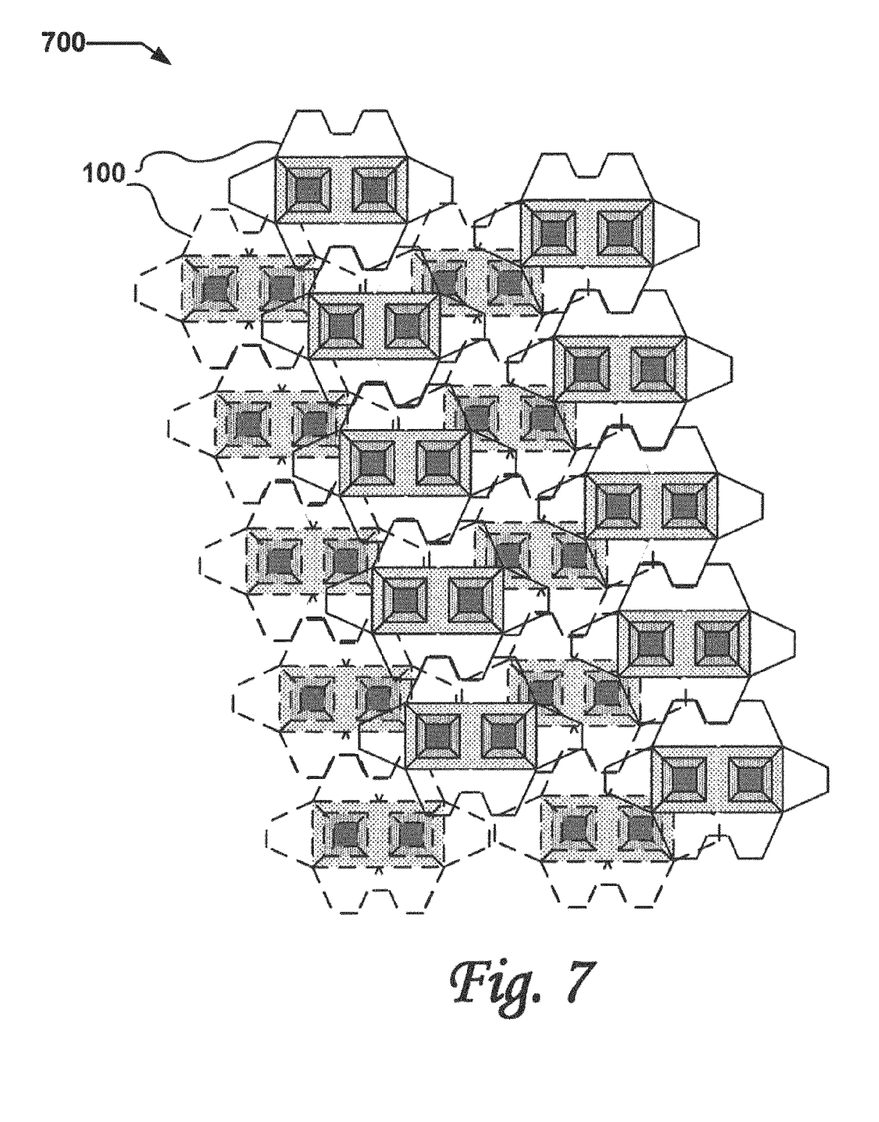
FIG. 7 is a top view of a multi-layer interlocking configuration of the embodiments of FIG. 1 as may be installed on a breakwater.

Refer to FIG. 7, an interlocking multi-layer configuration 700 of the individual armor units 100 as shown in FIG. 1. The individual units 100 are arranged in two layers with longitudinal axes oriented horizontally along the slope of the breakwater. The multi-layer configuration covers the gaps present in the single layer configuration of FIG. 6, albeit at a greater expense for the same size armor units 100.

Figure 8:
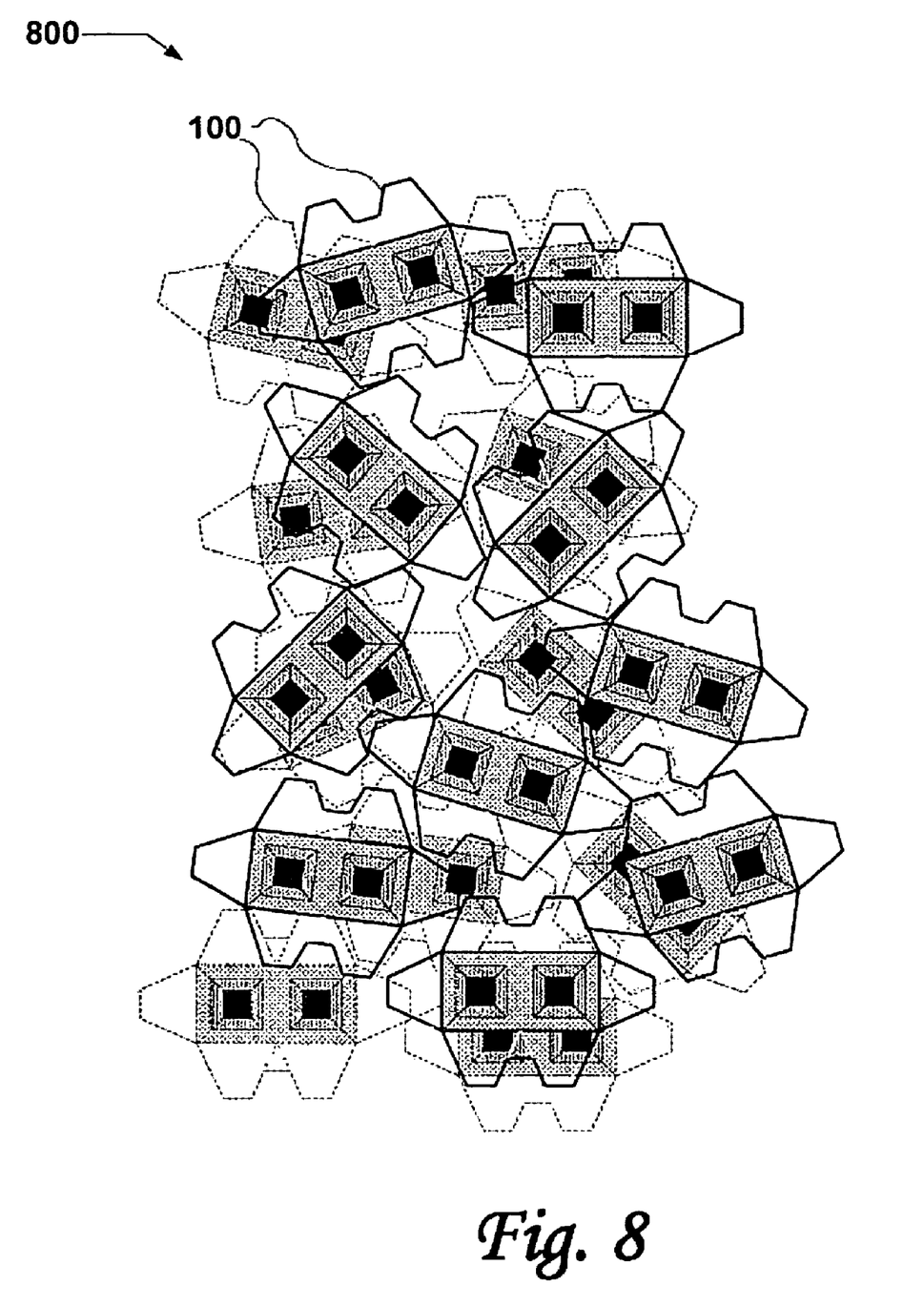
FIG. 8 is a top view of a random multi-layer interlocking configuration of the embodiments of FIG. 1 as may be installed on a breakwater.

Although FIG. 7 shows alignment of the armor units 100 horizontally in a precise interlocking order over the slope of the breakwater, armor units 100 may be randomly placed in one or multi-layers with orientation of the unit's longitudinal axis with respect to the slope of the breakwater up to 45° from horizontal. See FIG. 8 in which each armor unit 100 in a bottom layer is arranged higgledy-piggledy with respect to its neighbors and overlaid with a top layer arranged in the same manner. It is evident that there is still available a considerable amount of interlocking and full coverage of the under layer of the breakwater even in a pseudo-random or random orientation of the armor units 100 when arranged in multiple layers.

Figure 9A:
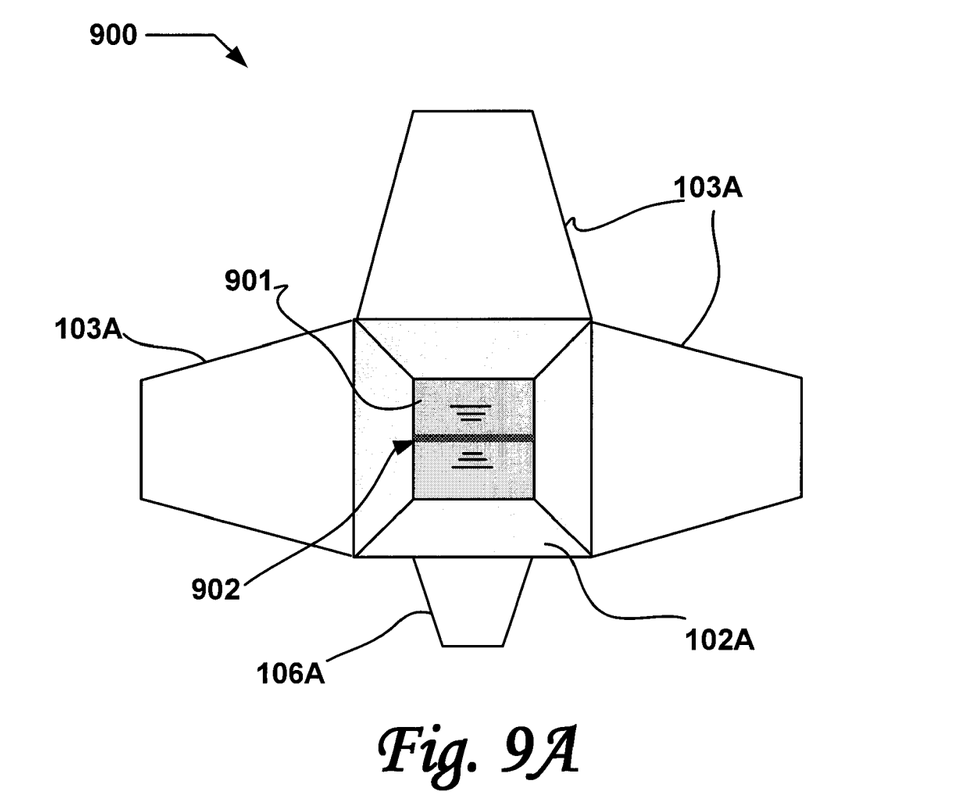
FIG. 9A is an end view of a select embodiment of the present invention that is similar to the embodiment as shown in FIG. 5, differing only in that the end frusta terminate in an integral chisel shape.
Figure 9B:
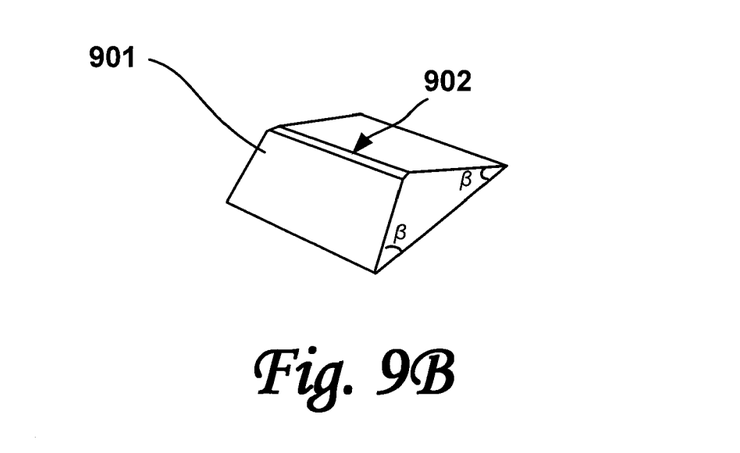
FIG. 9B is a perspective view of the chisel shape of the ends of the end frustum in FIG. 9A.

Refer to FIG. 9A, an end view of an embodiment similar to the embodiment as shown in end view in FIG. 5, except for termination in a blunt 902 chisel shape 901 at the distal end of each end frustum 102A, B. These chisel-shaped terminations 901 may be provided to improve ease of removal of an embodiment from a casting form or for enhancing the integrity of the distal ends of embodiments, or both. FIG. 9B is a perspective of the blunt 902 chisel-shaped termination 901 alone. In one embodiment of the present invention this configuration adds length to each of the end frusta 102A, B represented in FIG. 1 if the same size frusta are used for the end frusta 102A, B as for the side and top frusta 103A, B prior to incorporating the integral blunt 902 chisel-shaped termination 901. If the angle β is kept small, e.g., less than about 10° and preferably about 5°, then the additional mass added to the end frusta 102A, B is minimized, while the ease of removing a casting form is optimized.

Figure 10:
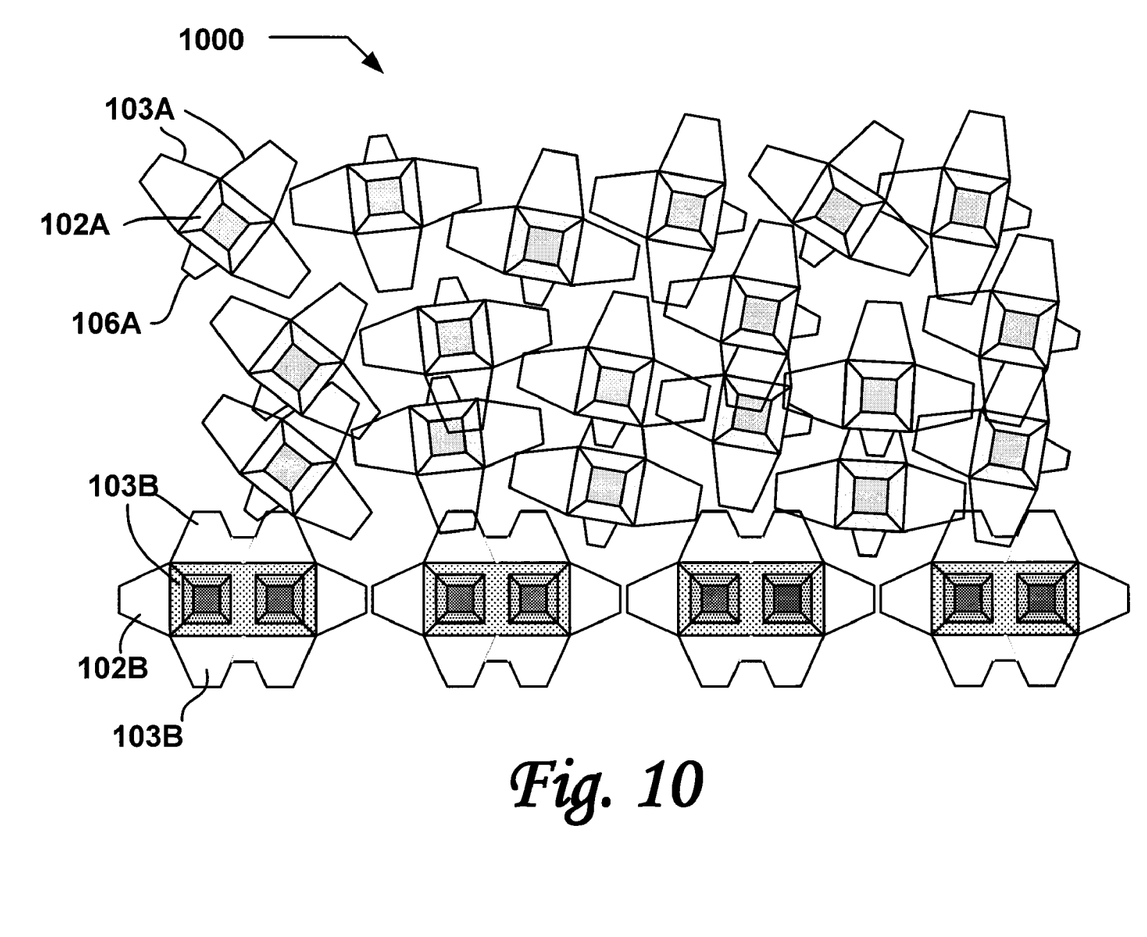
FIG. 10 is a top view of a configuration of the embodiments of FIG. 1 in which all but the bottom row are arranged with the bottom of the embodiment of FIG. 1 as one of the sides.

Refer to FIG. 10. A first row of armor units may be placed on a sloping breakwater at the toe of the slope in much the same manner as shown in FIG. 6, i.e., in a single plane with the "bottom" (side with the extrusions 106A, B not visible in FIG. 10) placed adjacent the understructure (not shown separately). Second and succeeding rows may be arranged such that the longitudinal axis is roughly perpendicular to the slope and a "side" (side with the frusta 103A, B) is placed adjacent to a neighboring armor unit 100 such that the rotation about the longitudinal axis is random as shown in the second, third and fourth rows of FIG. 10. Some armor units 100 may be placed with the bottom turned 90° (i.e., as one side of the emplaced armor unit 100) as shown in the second, third and fourth rows of FIG. 10 so that the bottom of an armor unit 100 need not always face down. Further, the individual armor units 100 need not be in the same plane, i.e., they may overlap with other armor units 100 in the same or adjacent rows making the row taller where overlap occurs and shorter where the armor unit 100 angles down on an opposite side as a result of the overlap. This configuration of armor units 100 is suited to steeper slopes and those where high or murky water limits the visibility that would permit a "structured" interlocking of armor units 100 as shown in FIGS. 6 and 7. Note also that although FIG. 10 does not employ armor units 100 with the chisel-shaped end caps 901 of FIG. 9, the embodiment of FIG. 9 may be used in the breakwater of FIG. 10 or any other breakwater, including those comprising completely random placement of one or multiple layers of armor units 100.

The abstract of the disclosure is provided to comply with the rules requiring an abstract that will allow a searcher to quickly ascertain the subject matter of the technical disclosure of any patent issued from this disclosure. 37 CFR §1.72 (b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for providing a suitable armor unit having symmetry on at least three sides, other alternatives are possible, to include selection of different slope angles, α, for one or more sides, different heights, d, for one or more sides, a different number and type of extrusions 106A, B, and the like. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

We claim:

1. An armor unit for stabilizing rubble mound structures such as coastal revetments, breakwaters, and the like, comprising:

a central configuration having a length, a width and a depth, dimensions of which said length, said width and said depth are established by dimensions of right frusta of identical dimensions, each said right frusta having at least sides and a distal base said distal base having an area defined by an angle, α, of uniform taper of the sides of each said right frustum from said central configuration and a height, d, of each said right frustum and a square proximal base establishing both said width and said depth of said central configuration, said square proximal bases of two abutting said identical right frusta establishing said length, said central configuration having two ends established by said width and said depth and four sides established by said length and said depth, a first pair of parallel said sides established as top and bottom, respectively, and a second pair of parallel said sides established as the sides of said central configuration, said top and said second pair of parallel sides incorporating two said identical right frusta on said top and each side of said second pair of sides, said ends incorporating one said identical right frusta on each said end of said central configuration; and fillets of depth, t, applied as inverted triangles coming to a point where said proximal bases intersect for each said pair of right frusta, said t<said d, said right frusta cast integrally with said fillets and said central configuration in a first casting, wherein, said fillets minimize internal stress levels of said armor unit; and at least one extrusion incorporated on said bottom of said armor unit, wherein said at least one extrusion is cast separately from said first casting, and wherein said separate casting permits said first casting to be cast on a flat surface thereby reducing internal stress levels on said armor unit, and wherein said uniform taper facilitates removal of a mold for casting said armor unit.

2. The armor unit of claim 1 in which said bottom incorporates at least two extrusions, wherein, said at least two extrusions provide an irregular bottom surface and facilitate interlocking of said armor units.

3. The armor unit of claim 2 in which each said at least two extrusions is one of said right frusta.

4. The armor unit of claim 3 in which said at least two right frusta are equal one to another in each dimension and angle of inclination.

5. The armor unit of claim 1 in which the right frusta are incorporated in said ends to terminate in a chisel shape such that said distal base of said right frusta terminating in a chisel shape is terminated with two opposing sides of said frusta at an angle, β, with respect to said distal bases, said angle β less than said angle α.

6. The armor unit of claim 5 in which said angle β is less than about 10°.

7. The armor unit of claim 1 comprising at least in part concrete.

8. The armor unit of claim 7 in which said concrete is concrete conventionally described as very high strength concrete (VHSC).

9. The armor unit of claim 1, comprising at least in part reinforcement.

10. The armor unit of claim 9 in which said reinforcement comprises metal.

11. The armor unit of claim 9 in which said reinforcement comprises coated metal,
wherein said coating improves bonding strength of said reinforcement to said concrete.

12. An array of said armor units of claim 1 dispersed so as to wedge said armor units against other, said armor units thereby stabilizing breakwaters of varying slopes,
wherein, said array is constructed such that each said armor unit is placed in close proximity to at least one other said armor unit such that said array reduces or prevents movement of an under layer, and
wherein, placement of said armor units on one of said breakwaters can be done in low visibility conditions and with moderate background wave conditions.

13. The array of claim 12 in which a longitudinal axis of each said armor unit is placed approximately perpendicular to the slope of said one of said breakwaters.

14. A method of stabilizing a breakwater incorporating a slope to water comprising:
placing a single layer array of said armor units of claim 1, arranging a longitudinal axis of each said armor unit perpendicular to said slope of said breakwater,
wherein said placing results in a series of zigzag horizontal lines of said armor units each said armor unit in a line abutting with one of said armor units in said lines above and below and each said armor unit having end frusta abutting along said slope with said end frusta of adjacent said armor units in each said horizontal line.

15. The method of claim 14 further comprising placing said armor units arranged in two layers with said longitudinal axis of each said armor unit oriented perpendicular to said slope of said breakwater.

16. A method of stabilizing a breakwater incorporating a slope to water comprising randomly placing a plurality of said armor units of claim 1 with orientation of a longitudinal axis of each said armor unit with respect to said slope arranged at a maximum of about 45° from perpendicular to said slope.

17. An armor unit, comprising:
a rectangular central core of length longer than width and the width at least as long as depth;
two identical end frusta of a first specified height, one at each end of said central core, said ends of said central core defined by said width and said depth, said end frusta-contributing to extending said central core longitudinally;
three identical pairs of frusta of a second specified height, each said pair joined by a fillet established as an inverted triangle, a tip of which triangle abuts at a location where a proximal base of each said frustum in said pair abuts, a first and second of said -pairs located on first and second opposing sides of said central core, respectively, said first and second opposing sides parallel one to the other as established by said length and said depth, a third of said pairs located on a third side established by said length and said width, said third side identified as the top of said central core, said third side perpendicular to said first and second sides,
wherein internal stress levels are minimized by adding said fillets; and
two identical bottom frusta that protrude from a fourth side of said central core identified as the bottom of said central core, said bottom opposing and parallel to said top of said central core,
wherein all said frusta contribute to providing hydraulic stability and wave energy dissipation.

18. The armor unit of claim 17, the four sides of each said frusta established at an angle, α, measured from respective surfaces of said central core and wherein said first specified height of each said three pairs of side frusta is equal to said second specified height of said two end frusta as length, d, thus establishing an area for a distal end of each said side and each said end frusta, the depth of each said fillet established at approximately one-third of said d.

* * * * *